United States Patent [19]
Stelter

[11] 4,016,968
[45] Apr. 12, 1977

[54] METHOD AND APPARATUS FOR ORIENTING CAN ENDS

[75] Inventor: Ronald B. Stelter, Country Club Hills, Ill.

[73] Assignee: The Continental Group, Inc., New York, N.Y.

[22] Filed: Sept. 5, 1975

[21] Appl. No.: 610,900

[52] U.S. Cl. .............................. 198/394; 198/401; 198/414

[51] Int. Cl.² ...................................... B65G 47/24

[58] Field of Search .......... 198/241, 243, 244, 257, 198/261, 263, 394, 401, 414

[56] References Cited
UNITED STATES PATENTS

| | | | |
|---|---|---|---|
| 2,293,553 | 8/1942 | Magnusson | 198/261 |
| 2,577,341 | 12/1951 | Magnusson | 198/261 X |
| 2,708,502 | 5/1955 | Carter | 198/257 |
| 2,756,863 | 7/1956 | Laxo | 198/210 X |
| 2,919,788 | 1/1960 | Geertsen | 198/257 |
| 2,968,387 | 1/1961 | Lagler | 198/244 |
| 3,527,334 | 9/1970 | Wideman | 198/244 |
| 3,528,575 | 9/1970 | McCaughey | 198/218 X |
| 3,628,451 | 12/1971 | McClellan et al. | 198/243 X |
| 3,628,650 | 12/1971 | Rouse | 198/257 |
| 3,934,714 | 1/1976 | Matsumoto | 198/244 |

FOREIGN PATENTS OR APPLICATIONS 1,074,486   2/1958   Germany ........................... 198/257

*Primary Examiner*—Evon C. Blunk
*Assistant Examiner*—Richard K. Thomson
*Attorney, Agent, or Firm*—John J. Kowalik; Joseph E. Kerwin; William A. Dittmann

[57] ABSTRACT

A method and apparatus for positioning an article to a predetermined position. The article is provided with a temporary orientation tab struck from the article; the tab eventually being cut off in further manufacture of the article. A reciprocating conveyor deposits the article onto a rotating slip-clutch driven mandrel to which the article is pressed by an overhead spring-biased holder. The mandrel rotates with the article until the tab on the article engages a stop on the apparatus whereupon the clutch slips and means on the conveyor clamp the article in oriented position, the conveyor lifting the article off the mandrel and advancing it to the next manufacturing station.

5 Claims, 4 Drawing Figures

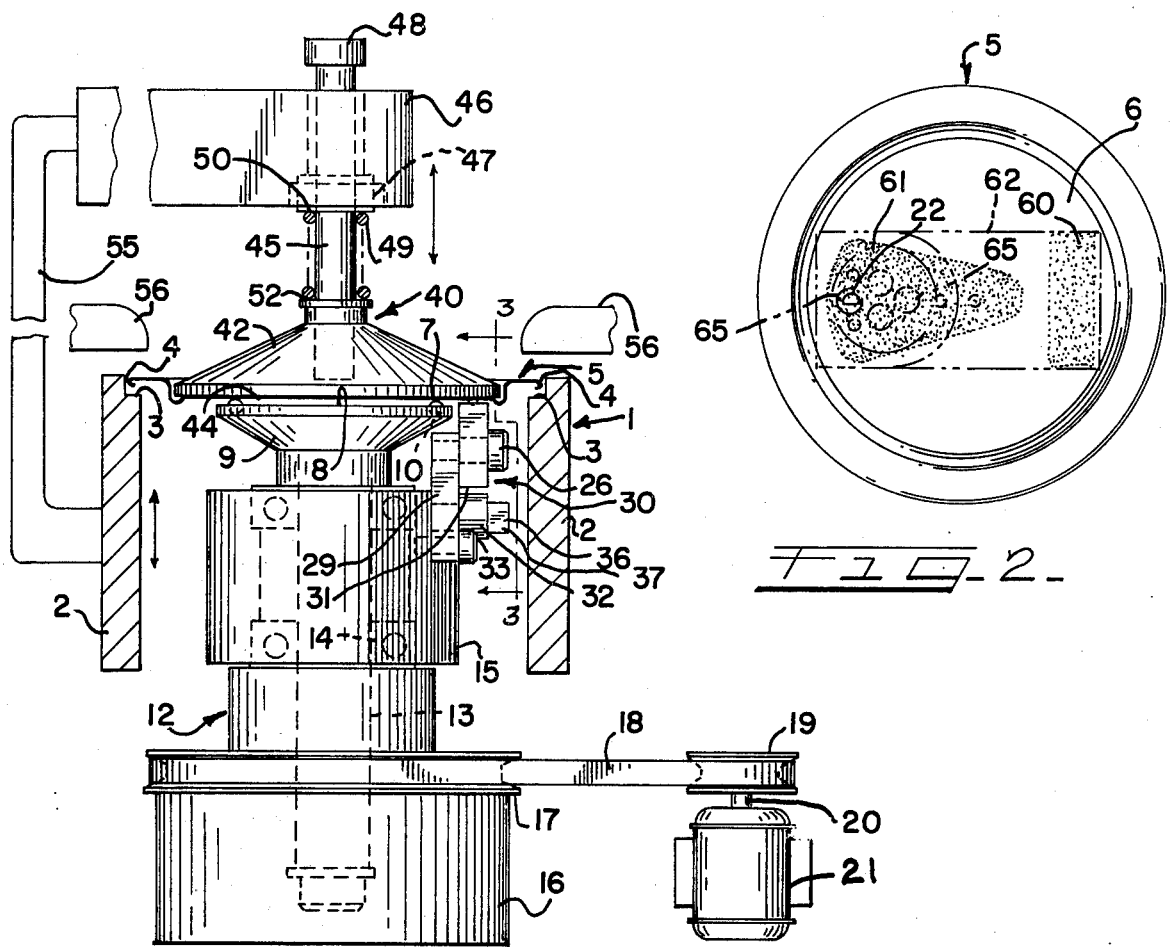
Fig. 1
Fig. 2
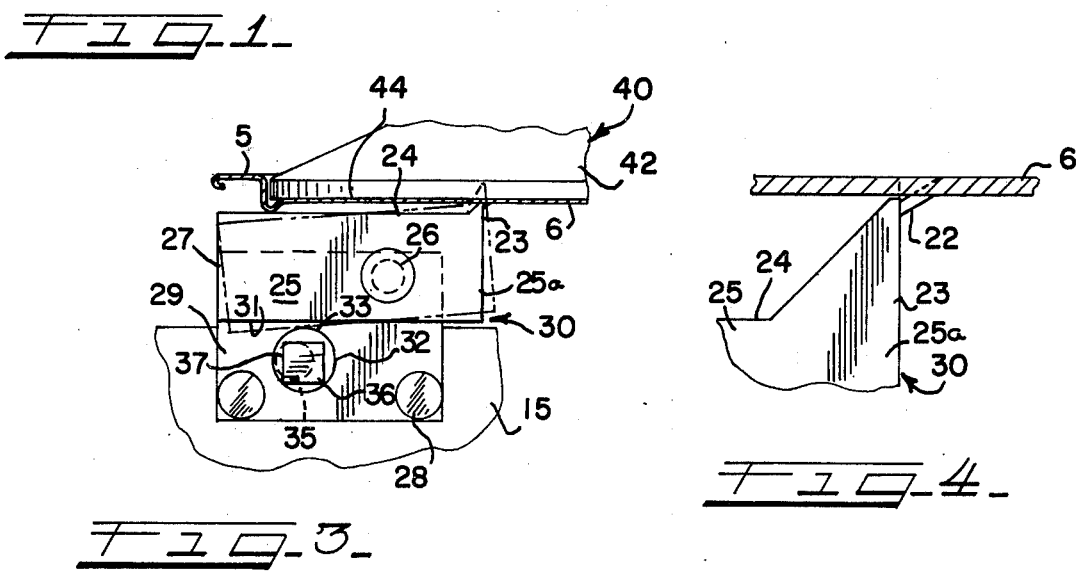
Fig. 3
Fig. 4

METHOD AND APPARATUS FOR ORIENTING CAN ENDS

DISCUSSION OF THE PRIOR ART

The best known art are U.S. Pat. Nos. 3,628,650 and 2,968,387 which illustrate mechanisms for orienting can ends.

Other pertinent patents are U.S. Pat. Nos. 3,820,647, 3,527,334, 3,462,823, 3,478,860, 3,021,938 and 2,683,521.

None of these patents disclose an orienting device which utilizes a mechanical slip-clutch drive for a mandrel particularly in an arrangement wherein the transfer mechanism reciprocates to lift the end piece and shift the piece to the next station without marring or scratching the protective coatings previously applied to the end piece. Also, the prior art does not disclose making an interim stop in an end piece and then cutting the stop out of the piece to form the end product.

SUMMARY OF THE INVENTION

This invention relates to a mechanism particularly adapted for orienting the end member of a container. These end members are coated with thin films of protective coating such as lacquers or enamels to prevent iron deposits from entering into the contents or in preventing electrolysis action.

A general object of the invention is to provide a novel orienting mechanism in which the part to be oriented is formed with a temporary stop and in which this stop functions to hold the part from rotating wherein the part and drive are engaged in such manner as to prevent rotation therebetween so as not to scratch the films on the part.

A further object is to provide a novel clamping arrangement for the part against the drive means so that relative rotation is prevented between the part and the drive means and slip-clutch means being provided in the drive means to disconnect the torque forces from rotating the disc beyond a certain predetermined load.

These and other objects and advantages inherent in and encompassed by the invention will become more readily apparent from the specification and the drawings wherein:

FIG. 1 is a side elevational view of the novel orienting device incorporated in a transfer mechanism shown fragmentarily in cross-section;

FIG. 2 is a top end view of an end member of the type adapted to be oriented;

FIG. 3 is an enlarged fragmentary sectional view taken substantially on line 3—3 of FIG. 1; and FIG. 4 is a still further enlarged fragmentary view of a portion of the structure shown in FIG. 3.

DESCRIPTION OF THE INVENTION

The invention is shown in association with a conveyor or transfer apparatus generally designate 1 and more particularly described in U.S. Pat. No. 3,528,575 which structure is incorporated herein by reference. The invention, however, is also useful with other transfer apparatus such as for example shown in U.S. Pat. No. 3,620,381. Suffice it to say that the transfer mechanism includes reciprocating transfer bars 2,2 which are provided with ledges 3,3 onto which are received diametrically opposed peripheral edge portions 4,4 of an article 5, which in the present instance is a container end panel.

The end panel 5 has a central body portion 6 which is seated upon an annular elastomer friction ring 7 which is suitably adhered to the top side 8 of an end plate 9 within a groove 10 therein. The end plate 9 forms the upper end of a mandrel generally designate 12 which comprises a vertically disposed shaft 13 journaled in bearings 14 carried by a suitable support 15. The lower end of the shaft 13 extends below the support and is connected to an output element of a friction clutch 16. The clutch has an input element connected to the input drive sheave or pulley 17 which is driven by a belt 18 from a pulley 19 connected to the output shaft 20 of a power source such as an electric motor 21. The friction clutch is set to transmit a predetermined torque which when exceeded causes the clutch to slip thus stopping rotation of the end plate or end member 5 seated upon said end plate. The end member has a preformed dependent tab 22 therein for engaging a stop 23 of a sensor 30. The stop 23 projects upwardly from the upper edge 24 of a pivot block 25 at its upwardly biased end 25a.

It will be understood that the pivot 26 of the libratory element 25 is positioned off-center with respect to the length of element 24, that is closer to the lifting end 25a than to its descending end 27. Thus the libratory element is designed to continuously bias its end 25a upwardly to engaging position with the stop 23.

The pivot element 26 may be in the form of a horizontally positioned bolt threaded into the side of a mounting block 29 which is suitably secured as by bolts 28 to the support frame 15.

Below the lower edge 31 of the element 25, adjacent to end 27, there is positioned an abutment member 32 in the form of an eccentric which has a cylindrical abutment surface 33 adapted to engage the underedge 31 of the element 25 as seen in phantom lines in FIG. 3 to limit the extent of upward movement of the stop end 25a so that minimal downward movement will be required to position the bottom of the disc against the stop 23 on the member 25. This type of gravity controlled arrangement is simple and effective and depending upon the weight of the member 25 and the relative lengths of the lever can be made to very lightly touch the underside of the end panel and thus prevent scratching of the protective coverings applied to the metal of the end member. The cam abutment or limit 32 has an eccentric journal opening 35 therein through which is extended a securing bolt 36 which is threaded into the support frame. The bolt 36 has a head 37 which upon threading the bolt 36 draws the cam abutment 32 tightly against the frame thus securing the abutment 32 in adjusted position.

In operation, the end piece is advanced from a preceding station by the conveyor and deposited on the mandrel ring 7. Thereafter, an upper clamp 40 descends onto the end piece, said clamp having a pad element 42 which fits into the end piece and engages the top side 44 thereof. The annular pad element 42 is connected to an upstanding stem 45 which is journaled in an arm 46 via bearings 47. The upper end of the stem has a stop shoulder 48 formed thereon which limits downward movement of the clamp under the bias imposed by a compression spring 49 which is sleeved over the stem 45 and seated at its upper end against the underside of the arm as at 50 and at its lower end as at 52 against the upper side of the clamp pad 42.

The end piece in being placed upon the mandrel depresses the sensor lug 23 which is positioned on the locus of movement of the tab 22. The end piece rotates until tab 22 engages stop 23. Thereafter the clutch slips.

It will be noted that the rail assembly which normally advances the end piece is connected by a linkage 55 to the mounting arm 46 to effect synchronous movements of the clamp in pressing the end piece down against the mandrel concurrently with release of the end piece by the clamps 56,56 which normally hold the end piece on the rails. Upon the upper clamp being released, the side clamps grasp and hold the end piece in oriented position against the side rails.

As best seen in FIG. 2, the orientation of the end panel is necessitated by the prior application of geometrically shaped adhesive regions 60,61 on the end panel for proper application of a tape 62 shown in phantom lines in FIG. 2. The temporary tab 22 is shown in a location where it is cut out in a subsequent station to form the pour apertures 65,65 after the tab has served its purpose.

What is claimed is:

1. In a mechanism for orienting a substantially planar article to a predetermined angular position said article having stop means formed thereon, comprising:
    a sensor mateable with said stop means;
    a rotating drive means;
    means for depositing said article upon said drive means into contact with said sensor thereupon terminating rotation of said article, to hold the same in oriented position; and
    said drive means including clutch means arranged to slip upon contact being made by the stop means and said sensor to prevent abrasion between the drive means and said article; and
    said drive means including a vertically disposed mandrel rotatable on a generally vertical axis, a pad at the upper end of the mandrel for seating said article, and said sensor comprising a libratory element pivotally mounted on a substantially horizontal axis for vertical pivotal movement and having a stop projecting upwardly from said element and movable to the locus of said stop means into intercepting relation therewith; and
    said libratory element having a lower edge and means engageable with said lower edge for limiting pivotal movement of the element in a direction biasing said stop upwardly; and
    clamp means vertically aligned with the mandrel and having means biasing the same downwardly into a position clamping the article between the same and the mandrel; and
    said means for depositing said article upon the drive means comprising reciprocating conveying means, and link means operatively connecting said clamp means with the conveying means for holding the article upon the mandrel when the article is placed thereon and releasing the article from the clamp means upon said conveying means initiating movement of the article to a succeeding station.

2. The invention according to claim 1 and said stop means comprising an excisable tab formed from said article.

3. The invention according to claim 2 and said tab formed in a location spaced from the center of the article and projecting below the lower side thereof, and said sensor including an upwardly biased stop adapted to engage said tab, and said drive means including a deflectable ring of elastomer material for maintaining a friction grip upon the article.

4. The invention according to claim 3 and said sensor comprising a pivot bar positioned beneath the article and having a horizontal pivot axis, and stop means on the bar biased attendant to pivoting of the bar into mating relation with the tab on the article.

5. The invention according to claim 4 and said bias being gravitationally unbalanced and effective to bias said bar in a direction urging said stop means upwardly.

* * * * *